US008510556B2

(12) United States Patent
Cao et al.

(10) Patent No.: US 8,510,556 B2
(45) Date of Patent: Aug. 13, 2013

(54) AUTHENTICATION METHOD, SYSTEM, SERVER, AND USER NODE

(75) Inventors: Zhenfu Cao, Shenzhen (CN); Xiaolei Dong, Shenzhen (CN); Rongxing Lu, Shenzhen (CN); Jiwei Wei, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 682 days.

(21) Appl. No.: 12/497,930

(22) Filed: Jul. 6, 2009

(65) Prior Publication Data
US 2009/0271624 A1 Oct. 29, 2009

Related U.S. Application Data

(63) Continuation of application No. PCT/CN2008/072863, filed on Oct. 28, 2008.

(30) Foreign Application Priority Data

Oct. 29, 2007 (CN) .......................... 2007 1 0176473

(51) Int. Cl.
*H04L 9/32* (2006.01)
*G06F 21/44* (2013.01)
(52) U.S. Cl.
CPC ............ *G06F 21/445* (2013.01); *H04L 9/3242* (2013.01); *H04L 9/3273* (2013.01)
USPC .............................. 713/169; 713/171; 726/7
(58) Field of Classification Search
USPC ........................................................ 713/169
See application file for complete search history.

(56) References Cited

U.S. PATENT DOCUMENTS 5,737,424 A * 4/1998 Elteto et al. .................. 380/28
6,009,528 A * 12/1999 Teraoka ........................ 726/22

(Continued)

FOREIGN PATENT DOCUMENTS

| CN | 1427609 A | 7/2003 |
| CN | 1444169 A | 9/2003 |

(Continued)

OTHER PUBLICATIONS

International Search Report from P.R. China in International Application No. PCT/CN2008/072863 mailed Feb. 5, 2009.

(Continued)

*Primary Examiner* — Matthew Henning
(74) *Attorney, Agent, or Firm* — Conley Rose, P.C.; Grant Rodolph; Nicholas K. Beaulieu

(57) ABSTRACT

The embodiments of the present disclosure disclose an authentication method, a system, a server, and a user node are disclosed herein. The method includes: generating, by a server, a server session key according to the identity information, at least one login information parameter, and the validity period included in the login information, generating at least one session key parameter of a user node according to the generator point of the algebraic curve, and sending at least one session key parameter of the user node to the user node; generating, by the user node, a user node session key according to at least one session key parameter of the user node; performing, by the server and the user node, mutual authentication according to the session keys. The authentication solution under the present disclosure is simple and practicable, and is also applicable to authenticating the user node in a grid computing platform.

17 Claims, 4 Drawing Sheets

(56) References Cited

U.S. PATENT DOCUMENTS

| | | | |
|---|---|---|---|
| 6,119,229 A * | 9/2000 | Martinez et al. | 726/28 |
| 6,446,205 B1 | 9/2002 | Lenstra | |
| 6,757,825 B1 * | 6/2004 | MacKenzie et al. | 713/169 |
| 6,802,000 B1 * | 10/2004 | Greene et al. | 713/168 |
| 7,024,548 B1 * | 4/2006 | O'Toole, Jr. | 713/1 |
| 7,694,335 B1 * | 4/2010 | Turner et al. | 726/14 |
| 2001/0056535 A1 * | 12/2001 | Vanstone et al. | 713/169 |
| 2002/0018569 A1 * | 2/2002 | Panjwani et al. | 380/247 |
| 2003/0065956 A1 * | 4/2003 | Belapurkar et al. | 713/202 |
| 2003/0079128 A2 * | 4/2003 | Mullen et al. | 713/173 |
| 2003/0097573 A1 * | 5/2003 | Wheeler et al. | 713/182 |
| 2004/0078571 A1 * | 4/2004 | Haverinen | 713/168 |
| 2004/0230800 A1 * | 11/2004 | Futa et al. | 713/169 |
| 2005/0149730 A1 * | 7/2005 | Aissi et al. | 713/168 |
| 2005/0239447 A1 * | 10/2005 | Holzman et al. | 455/414.3 |
| 2006/0069921 A1 | 3/2006 | Camaisa et al. | |
| 2006/0205388 A1 * | 9/2006 | Semple et al. | 455/411 |
| 2007/0061572 A1 * | 3/2007 | Imai et al. | 713/169 |

FOREIGN PATENT DOCUMENTS

| | | |
|---|---|---|
| CN | 1925390 A | 3/2007 |
| CN | 1980127 A | 6/2007 |
| CN | 1014255897 B | 5/2011 |
| JP | 2005-165631 | 6/2005 |

OTHER PUBLICATIONS

Written Opinion of the International Searching Authority (translation) dated (mailed) Feb. 5, 2009, issued in related application No. PCT/CN2008/072863, filed Oct. 28, 2008, Huawei Technologies Co., Ltd.

First Chinese Office Action dated (mailed) May 27, 2010, issued in related Chinese application No. 200710176473.7, Huawei Technologies Co., Ltd.

Liu, Jun et al., "An Authentication Protocol Without Validating Table Based on an Ellipse Curve", Network & Computer Security, Feb. 28, 2007.

Su, Jiandong et al., "Agent Signature for Reverting Messages by a Specified Receiver Based on an Elliptic Curve", published by Academic Research, Feb. 2005.

Foster, Ian et al., "The Anatomy of the Grid-Enabling Scalable Virtual Organizations", Intl. J. Supercomputer Applications (2001).

Chang, Ya-Fen et al., "Password Authentication without the Server Public Key", IEICE Trans. Commun., vol. E87-B, No. 10, Oct. 2004, pp. 3088-3091.

Yoon, Eun-Jun et al., "An Efficient Password Authentication Schemes Without Using the Server Public Key for Grid Computing", H. Zhuge and G.C. Fox (Eds.), GCC 2005, LNCS 3795, pp. 149-154 (2005).

Koblitz, Neal et al., "The State of Elliptic Curve Cryptography", Designs, Codes and Cryptography, vol. 19, pp. 173-193 (2000).

* cited by examiner

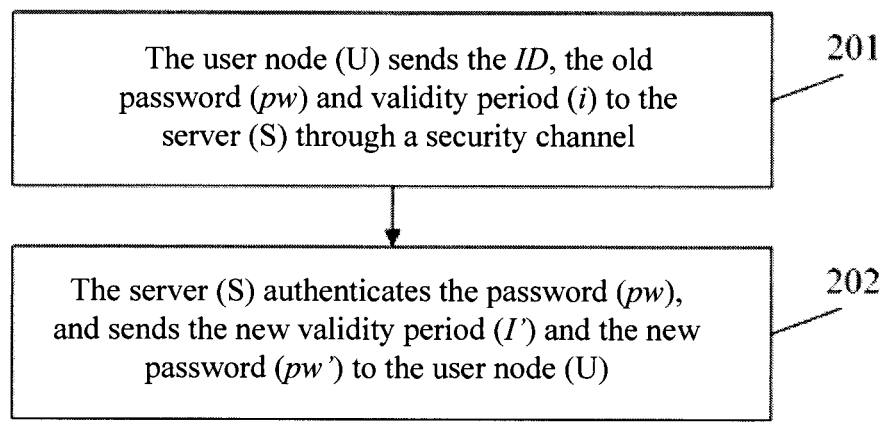
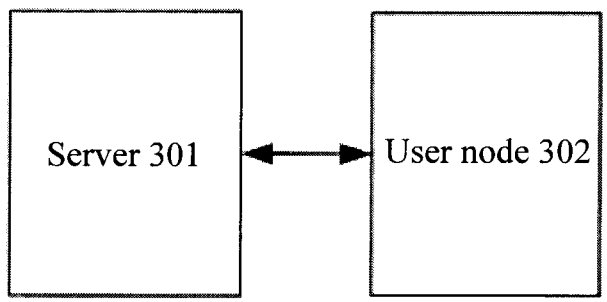
FIG. 2
FIG. 3
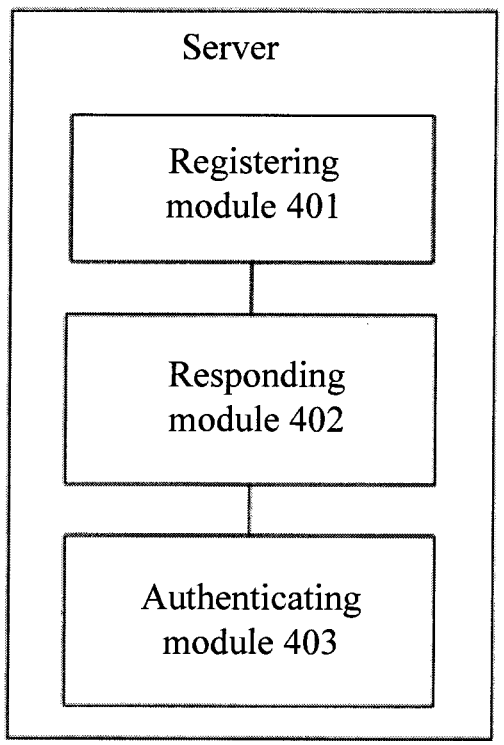
FIG. 4

AUTHENTICATION METHOD, SYSTEM, SERVER, AND USER NODE

CROSS-REFERENCE TO RELATED APPLICATIONS

This application is a continuation of International Patent Application No. PCT/CN2008/072863, filed on Oct. 28, 2008, titled "Authentication Method, System, Server, and User Node", which claims the priority of Chinese Patent Application No. 200710176473.7, filed on Oct. 29, 2007, titled "Authentication Method, System, Server, and User Node," the contents of both of which are incorporated herein by reference in their entireties.

FIELD OF THE DISCLOSURE

The present disclosure relates to network information security, and in particular, to an authentication method, a system, a server, and a user node.

BACKGROUND

In recent years, grid computing has been extensively researched in both the academic field and the practical application. As a distributed computing model, grid computing represents a new type of system. Such a system can combine heterogeneous computing resources such as computers, storage space, sensors, applications, and experimental results together through Internet connections, thus enabling a wider range of user groups to access the resources conveniently. For example, when a user requests some computing and data resources, the network may provide such resources through the Internet seamlessly, transparently, and dynamically in a way very similar to the mode of supplying electric power to terminal users in an electric power network.

However, grid computing aims to provide secure grid service resources for legal users. Therefore, security is one of the top priorities in grid computing. In order to prevent illegal users from accessing grid resources, mutual authentication needs to be performed between the user and the server.

An effective and practical password-based authentication solution is provided in the prior art to handle authentication. The solution includes the following steps:

U represents a user;
S represents a trusted server;
ID is an opened identity of the user;
pw represents a low-entropy password of the user;
K represents a server key;
p, q are two big prime numbers, where q|p−1;
g: GF(p) is a generator whose mid-order is q;
E(x, y) is a symmetric encryption algorithm, which encrypts y using x as a key; and
H( ) is a secure unidirectional Hash function.

First, the server stores the (ID, E(K, pw)) in the database through a key (K). For ease of description, mod p is omitted.

Login and Authentication

Step 1: The user (U) selects a random number $r_1$, and calculates $E(pw, g^{r_1})$. Afterward, user U sends the calculation result and the identity (ID) to the server as a login request.

Step 2: After receiving the login request, the server S finds the corresponding E(K, pw) according to the ID, uses K to decrypt the pw, uses the pw to obtain $g^{r_1}$, selects a random number $r_2$, and calculates the session key (sk) of the server (S): $sk=(g^{r_1})^{r_2}$. The server (S) calculates $g^{r_2}$ and $H(sk, g^{r_1})$, and sends the calculation result to the user (U).

Step 3: According to the received information, the user (U) calculates the session key (sk) of the user (U): $sk'=(g^{r_2})^{r_1}$, and checks the equation $H(sk, g^{r_1})=H(sk', g^{r_1})$ to authenticate the server (S). If the equation is fulfilled, the server (S) is authenticated successfully. The user (U) calculates $H(sk', g^{r_2})$, and sends the calculation result $H(sk', g^{r_2})$ and the ID to the server (S).

Step 4: The server (S) uses its own sk and $g^{r_2}$ to calculate the Hash value $H(sk', g^{r_2})$ and checks whether the equation $H(sk, g^{r_2})=H(sk', g^{r_2})$ is fulfilled. If the equation is fulfilled, the user is authenticated successfully. Therefore, the server (S) authorizes access resources to the user (U). Meanwhile, through mutual authentication between the user (U) and the server (S), $sk=sk'=g^{r_1 r_2}$ is used as a session key.

Changing a Password

Step 1: The user (U) selects a random number $r_1$ and a new password pw', and calculates $E(pw, (pw'\|g^{r_1}))$. The user (U) sends the calculation result and the ID to the server (S) as a login request.

Step 2: Upon receiving the login request, the server (S) uses the password (pw) to obtain $g^{r_1}$. The server (S) selects a random number $r_2$, calculates the session key (sk) $sk=(g^{r_1})^{r_2}$, $g^{r_2}$ and $H(sk, g^{r_1})$, and sends the calculation results to the user (U).

Step 3: The user (U) calculates the session key (sk) $sk'=(g^{r_2})^{r_1}$, checks whether the equation $H(sk, g^{r_1})=H(sk', g^{r_1})$ is fulfilled. If the equation is fulfilled, the authentication server (S) calculates $H(sk', g^{r_2})$, and sends the calculation result and the ID to the server (S).

Step 4: The server (S) uses its own sk and $g^{r_2}$ to calculate the Hash value $H(sk, g^{r_2})$ and checks whether the equation $H(sk, g^{r_2})=H(sk', g^{r_2})$ is fulfilled. If the equation is fulfilled, the server (S) authorizes the user (U) to access, and replaces E(K, pw) with E(K, pw'). Through mutual authentication between the user (U) and the server (S), $sk=sk'=g^{r_1 r_2}$ is used as a session key.

In the process of developing the present embodiments, at least the following defects were found in the prior art: because the symmetric encryption algorithm needs to be applied, the software (hardware) design is complicated; the server needs to maintain the stored (ID, E(K, pw)) authentication table, thus increasing the maintenance cost; and based on the GF(p), the login request data such as $E(pw, g^{r_1})$ is rather long in order to ensure security. For example, the length of p is 1024, and therefore, the length of $g^{r_1}$, $g^{r_2}$ needs to be 1024 bits.

SUMMARY

An authentication method, a system, a server, and a user node are disclosed in an embodiment of the present disclosure to optimize user node authentication. The embodiments of the present disclosure are as follows.

An authentication method is disclosed. The method includes: receiving, by a server, identity information from a user node, and selecting a validity period; generating a user node password according to the identity information and the validity period, and sending registration information including the user node password and the validity period to the user node; receiving, by the server, the login information from the user node, wherein the login information comprises the identity information, at least one login information parameter, and the validity period, and the at least one login information parameter is generated by the user node according to the user node password and the generator point of the algebraic curve; and generating, by the server, a server session key according to the identity information, at least one login information parameter, and the validity period in the login information; generating at least one session key parameter of the user node according to the generator point of the algebraic curve, and sending at least one session key parameter of the user node to the user node, wherein at least one session key parameter of the user node is used by the user node for generating a user node session key after the user node receives at least one session key parameter of the user node; and performing, by the server and the user node, mutual authentication according to the server session keys and the user node session key.

A network system is disclosed. The system includes: a server and a user node, wherein: the server is configured to: receive identity information from the user node, select a validity period, generate a user node password according to the identity information and the validity period, and send registration information including the user node password and the validity period to the user node; receive login information from the user node, generate a server session key according to the identity information, at least one login information parameter, and the validity period, generate at least one session key parameter of the user node according to the generator point of the algebraic curve, send at least one session key parameter of the user node to the user node, and authenticate the user node according to the server session key; and the user node is configured to: send identity information to the server; receive the registration information including the user node password and the validity period, generate at least one login information parameter according to the user node password and the generator point of the algebraic curve, send the login information including the identity information, at least one login information parameter, and the validity period to the server, receive at least one session key parameter of the user node, generate a user node session key according to the received at least one session key parameter of the user node, and authenticate the server according to the user node session key.

A server is disclosed. The server includes: a registering module configured to: receive identity information from the user node, select a validity period, generate a user node password according to the identity information and the validity period, and send registration information including the user node password and the validity period to the user node; a responding module configured to: generate a server session key according to the identity information, at least one login information parameter, and the validity period comprised in the login information after receiving the login information of the user node, generate at least one session key parameter of the user node according to the generator point of the algebraic curve, and send at least one session key parameter of the user node to the user node; and an authenticating module configured to authenticate the user node according to the server session key.

A user node is disclosed. The user node includes: a registering module configured to: send identity information to the server, and receive the registration information including the user node password and the validity period from the server; a login module configured to: generate at least one login information parameter according to the user node password and the generator point of the algebraic curve, and send the login information including the identity information, at least one login information parameter, and the validity period to the server; a user node session key generating module configured to: receive the at least one session key parameter of the user node from the server, and generate a user node session key according to at least one received session key parameter of the user node; and an authenticating module configured to authenticate the server according to the user node session key.

The embodiments of the present disclosure provide at least the following benefits:

In the embodiments of the present disclosure, the user node generates login information parameters according to the user node password and the generator point of the algebraic curve, the server can implement password-based secure and effective bidirectional authentication by generating the user session key parameters according to the generator point of the algebraic curve. Therefore, the authentication solution is simple and practicable, and is also applicable to password-based mutual authentication.

BRIEF DESCRIPTION OF THE DRAWINGS

In order to make the technical solution under the present disclosure clearer, the accompanying drawings for illustrating the embodiments of the present disclosure or illustrating the prior art are described briefly below. The accompanying drawings are for the exemplary purpose only, and those skilled in the art can derive other drawings from such accompanying drawings without making any creative effort.

FIG. 2 is a flowchart of a method for changing a login password according to a second embodiment of the present disclosure;

FIG. 3 shows a structure of a network system according to a third embodiment of the present disclosure;

FIG. 4 shows a structure of a server according to a fourth embodiment of the present disclosure;

DETAILED DESCRIPTION

Figure 1:
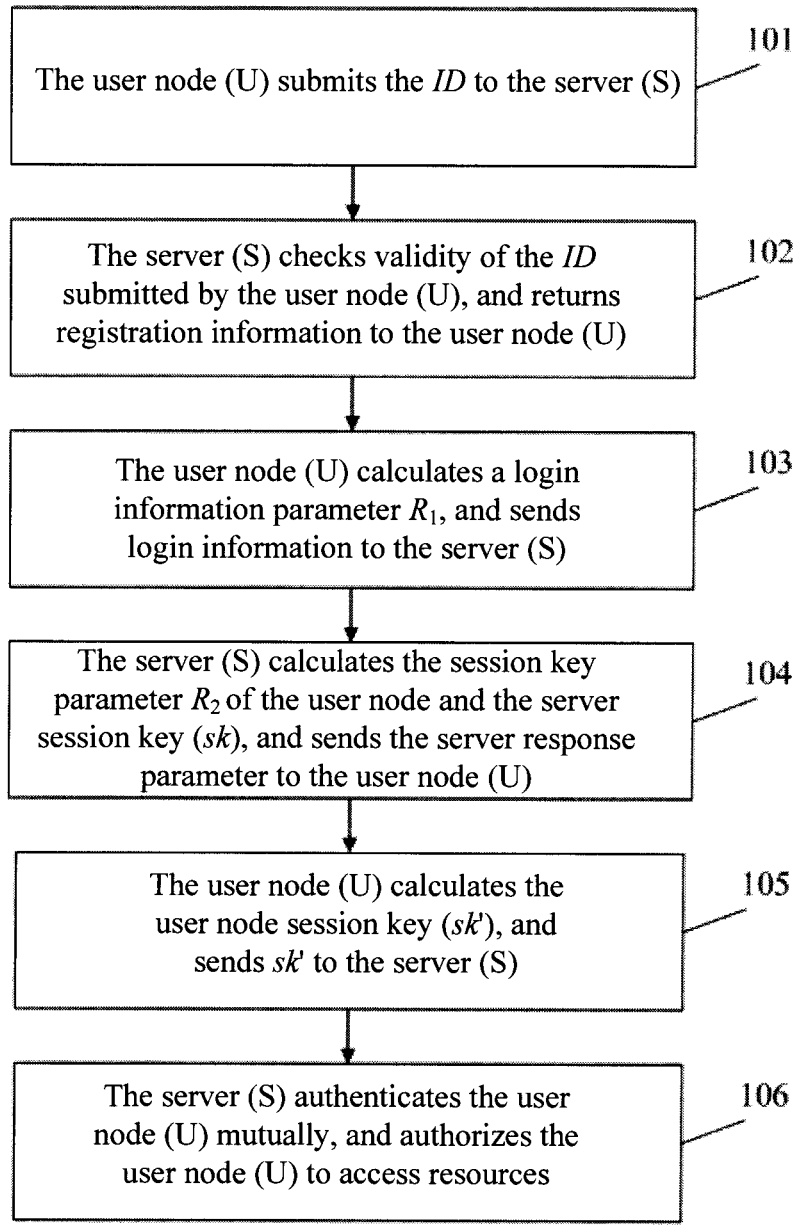
FIG. 1 is a flowchart of an authentication method according to a first embodiment of the present disclosure.

The embodiments of the present disclosure are described below by reference to accompanying drawings. The embodiments given herein are only part of the embodiments of the present disclosure. Those skilled in the art can derive other embodiments from the embodiments given herein without making any creative effort, and all such embodiments are covered by the protection scope of the present disclosure.

The method disclosed in an embodiment of the present disclosure includes: receiving, by a server, identity information from a user node, and selecting a validity period, generating a user node password according to the identity information and the validity period, and sending registration information including the user node password and the validity period to the user node; receiving, by the server, the login information from the user node, wherein the login information includes the identity information, at least one login information parameter, and the validity period, and at least one login information parameter is generated by the user node according to the user node password and the generator point of the algebraic curve; generating, by the server, a server session key according to the identity information, at least one login information parameter, and the validity period in the login information; generating at least one session key parameter of the user node according to the generator point of the algebraic curve, and sending at least one session key parameter of the user node to the user node, wherein at least one session key parameter of the user node is used by the user node for generating a user node session key after the user node receives at least one session key parameter of the user node; and performing, by the server and the user node, mutual authentication according to the session key generated by the server and the user node respectively.

Moreover, the method disclosed in an embodiment of the present disclosure further includes: sending, by the user node, the identity information, the old user node password, and the validity period to the server through a secure channel which is set up after authentication with the server; and generating, by the server, a user node password according to the server key, identity information and the validity period, determining whether the generated user node password is the same as the old user node password: if they are the same, selecting a new validity period, generating a new user node password according to the new server key, identity information, and the new validity period, and sending the new user node password and validity period to the user node through a secure channel.

The network types involved in an embodiment of the present disclosure include: mobile network, fixed network, mobile-fixed converged network, LAN, MAN, WAN, access network, core network, transmission network, point-to-point (P2P) network, and client/server (C/S)-structured network.

The embodiments of the present disclosure are described below in detail by reference to accompanying drawings.

Embodiment 1

An authentication method is disclosed in this embodiment. The method includes: receiving, by a server, identity information from a user node, generating a user node password, and sending registration information including the user node password and the validity period to the user node; generating, by the user node, at least one login information parameter, and sending the login information to the server; generating, by the server, a server session key; generating at least one session key parameter of the user node according to the generator point of an algebraic curve, and sending at least one session key parameter of the user node to the user node; generating, by the user node, a user node session key according to the received at least one session key parameter of the user node; and performing, by the server and the user node, mutual authentication according to the session key generated by the server and the user node respectively.

The algebraic curve may be an elliptic curve, a hyperelliptic curve, or a conic curve, etc. As shown in FIG. 1, in this embodiment, the user node (U) accesses resources, the server (S) is a trusted server that provides resources, the algebraic curve is an elliptic curve, and an authentication method based on the elliptic curve cryptography is disclosed. The method includes the following blocks:

The symbols involved in this embodiment are as follows:
U: user node;
S: a trusted server;
ID: an opened identity of the user node;
G: a subgroup whose upper order is q on the elliptic curve $E(F_p)$, where $P=(x_p, y_p)$ is its generator point;
D: evenly distributed storage space, whose size is $|D|=2^k$, $48 \leq k \leq 112$;
pw: a low-entropy password deriving from the user node in D;
K: a server key;
h: a secure unidirectional Hash function, $h: \{0,1\}^* \to \{0,1\}^l$, $l=160$;
$[m]^k$: the highest k bits of the string m; and
i: a validity period of the password (pw).

First, an ellipse-based curve group is constructed:

Supposing that $p>3$ is a safety big prime number, two domain elements $a, b \in F_p$ are selected, which fulfill $4a^3+27b^2 \neq 0 \bmod p$; and, a non-singular elliptic curve equation E on $F_p$ is defined, E: $y^2=x^3+ax+b \bmod p$, namely, the set of all solutions $(x, y) \in F_p \times F_p$ to the congruence equation $y^2=x^3+ax+b \bmod p$ plus the infinite point O. A generator point $P=(x_p, y_p)$ on an $E(F_p)$ is selected. The order of P is q, and $P \neq O$. In this way, a subgroup (G) whose upper order is q on the elliptic curve $E(F_p)$ is constructed.

At the registration stage, the user node submits its identity information to the trusted server. In this embodiment, the identity information is an ID. After checking the ID, the server generates a user node password, and returns registration information including a user node password and a validity period to the user node, thus finishing registering the user node on the server.

Block 101: The user node (U) submits the ID to the server (S).

Block 102: The server (S) checks validity of the received ID of the user node (U), selects a validity period (i), and calculates the Hash value $v=h(K\|ID\|i)$ according to the server key (K), and also generates a user node password $pw=[v]^k$ and returns registration information including the user node password $pw=[v]^k$ and the validity period (i) to the user node (U).

Now the registration stage is finished. The user node may undergo the following authentication stage according to the ID, user node password (pw) and the validity period (i):

Block 103: The user node (U) selects a random number $r_1 \in Z_q^*$, where $Z_q^*$ is a group composed of all positive integers which are less than q and coprime with q, calculates the login information parameter $R_1=(pw \cdot r_1)P$, and sends the ID, $R_1$ and i to the server (S) as login information (ID, $R_1$, i).

Block 104: After receiving the login information (ID, $R_1$, i) from the user node (U), server (S) obtains the user node ID and the validity period (i), and calculates the Hash value $v=h(K\|ID\|i)$, user node password $pw=[v]^k$, and server session key parameter $R_1'=pw^{-1}R_1=r_1P$ according to the original server key. A number $r_2$ is selected randomly in the $Z_q^*$. The session key parameter $(R_2=r_2P)$ of the user node, the server session key $sk=r_2R_1'=r_1r_2P$ and $h_1=h(sk\|R_2)$ are calculated. A server response message $(R_2, h_1)$ is sent to the user node (U).

Block 105: After receiving the $(R_2, h_1)$ from the server (S), the user node (U) calculates the user node session key $sk'=r_1R_2=r_1r_2P$, and then authenticates the server (S). In this embodiment, the authentication is performed by checking whether the equation $h(sk'\|R_2)=h_1$ is fulfilled. If the equation is fulfilled, the server (S) passes the authentication. Otherwise, the authentication of the server (S) fails. After the server (S) passes the authentication, the user node (U) calculates $h_2=h(sk'\|ID)$ and sends the calculation result to the server (S).

Block 106: The server (S) calculates $h_2'=h(sk\|ID)$, compares the calculated $h_2'$ with the received $h_2$. If $h_2'=h_2$, the user node (U) passes the authentication, and is authorized to access the resources.

In addition, after mutual authentication is performed successfully between the user node (U) and the server (S), $sk=r_1r_2P$ serves as a session key for future operations. For example, a secure channel may be set up between the user node (U) and the server (S) after the session key $sk=r_1r_2P$ is shared between U and S.

Through the method disclosed in this embodiment, the user node of both parties generates at least one login information parameter according to the user node password and the generator point of the algebraic curve. The server can implement password-based secure and effective mutual authentication by generating at least one user session key parameter according to the generator point of the algebraic curve. The authentication solution is simpler and more practicable than the prior art because it constructs only one algebraic curve group (such as elliptic curve group) and apply one security Hash function. The server stores a key rather than store a user node password table, thus facilitating maintenance and enhancing security.

Embodiment 2

As shown in FIG. 2, a method for a user node to change a login password after mutual authentication between the user node and the server is disclosed in an embodiment of the present disclosure. The method includes the following blocks:

Block 201: The user node (U) sends the ID, the old password pw and validity period i to the server (S) through a secure channel set up after mutual authentication between the user node (U) and the server (S).

Block 202: After receiving the ID, the old password pw and validity period i, the server checks whether the equation pw= $[h(K\|ID\|i)]^k$ is fulfilled. If the equation is fulfilled, the server (S) selects a new validity period i' and a new password pw'= $[h(K\|ID\|i')]^k$, and sends the (pw', i') to the user node (U) through a secure channel. Therefore, the user node obtains the new password pw' and the new validity period i'.

Through the method for a user node to change a login password disclosed in this embodiment, the server may generate a new validity period and a new password after authenticating the old validity period and the old password of the user node, and returns the new validity period and password to the user node through a secure channel. The method is easy to implement.

Embodiment 3

As shown in FIG. 3, a network system is disclosed in this embodiment. The network system includes:

a server 301 configured to: receive identity information from a user node 302, and select a validity period; generate a user node password according to the identity information and the validity period, and send registration information including the user node password and the validity period to the user node 302; receive login information from the user node 302, generate a server session key according to the identity information, at least one login information parameter, and the validity period, generate at least one session key parameter of the user node 302 according to the generator point of the algebraic curve, and send at least one session key parameter of the user node 302 to the user node 302; and authenticate the user node 302 according to the server session key; and a user node 302 configured to: send identity information to the server 301; receive the registration information including the user node password and the validity period, and generate at least one login information parameter according to the user node password and the generator point of the algebraic curve; send the login information including the identity information, at least one login information parameter, and the validity period to the server 301; receive at least one session key parameter of the user node 302, and generate a user node session key according to the received at least one session key parameter of the user node 302, and authenticate the server 301 according to the user node session key.

After mutual authentication between the user node 302 and the server 301 is performed successfully, the user node 302 is authorized to access the resources.

The algebraic curve may be an elliptic curve, a hyperelliptic curve, or a conic curve, etc.

The network system disclosed in this embodiment is simple and practicable because it constructs one algebraic curve group (such as elliptic curve group) and applies one security Hash function. Meanwhile, the server stores a key rather than store a user node password table, thus facilitating maintenance and enhancing security.

Embodiment 4

As shown in FIG. 4, a server is disclosed in this embodiment. The server includes:

a registering module 401 configured to: receive identity information from the user node, and select a validity period; generate a user node password according to the identity information and the validity period, and send registration information including the user node password and the validity period to the user node;

a responding module 402 configured to: generate a server session key according to the identity information, at least one login information parameter, and the validity period included in the login information after receiving the login information of the user node, generate at least one session key parameter of the user node according to the generator point of the algebraic curve, and send at least one session key parameter of the user node to the user node; and an authenticating module 403 configured to authenticate the user node according to the server session key.

Figure 5:
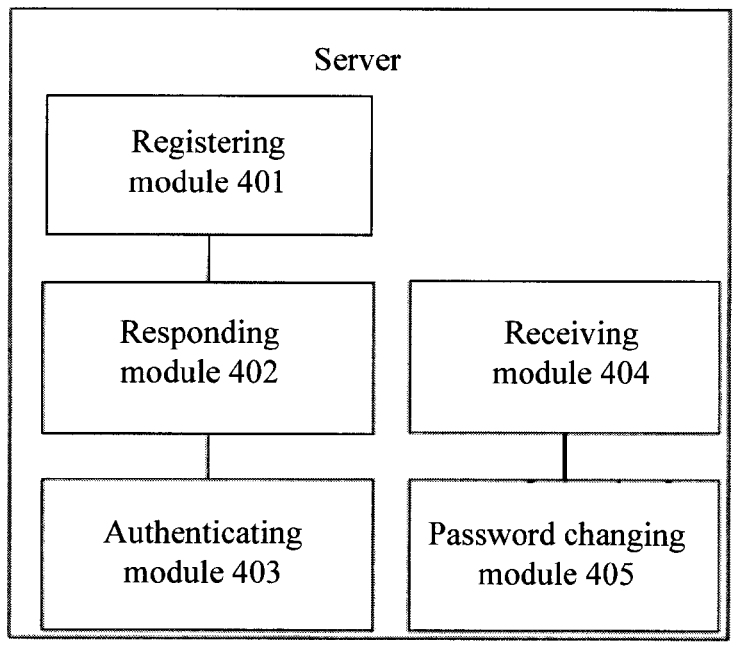
FIG. 5 shows details of structure of a server according to the fourth embodiment of the present disclosure.

Further, as shown in FIG. 5, the server disclosed in this embodiment includes:

a receiving module 404 configured to receive the identity information, and the old password and validity period sent by the user node; and a password changing module 405 configured to: generate a user node password according to the server key, identity information and the validity period received by the receiving module 404, determine whether the generated user node password is the same as the old user node password received by the receiving module: if they are the same, select a new validity period, generate a new user node password according to the new server key, identity information, and the new validity period, and send the new user node password and validity period to the user node.

The modules of the server in this embodiment may be integrated together or isolated as required.

The server in this embodiment may be an authentication server, or an Authentication Authorization Accounting (AAA) server, and so on.

As a server side, the server disclosed in this embodiment authenticates the user node by storing only a key rather than storing the user node password table, thus facilitating maintenance and enhancing security.

Embodiment 5

Figure 6:
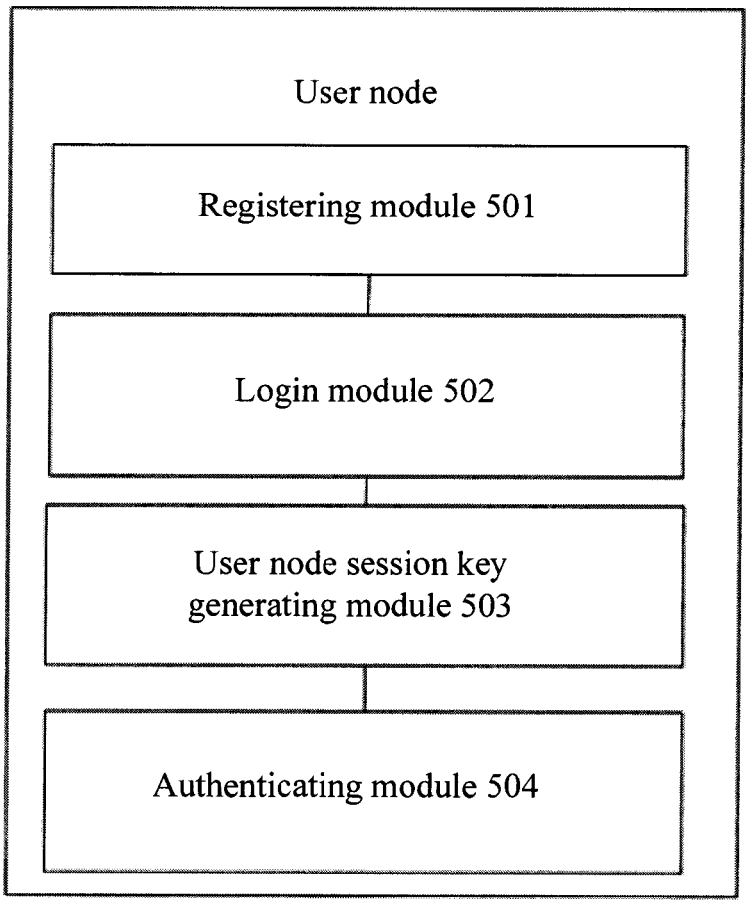
FIG. 6 shows a structure of a user node according to a fifth embodiment of the present disclosure.

As shown in FIG. 6, a user node is disclosed in this embodiment. The user node includes:

a registering module 501 configured to: send identity information to a server, and receive the registration information including the user node password and the validity period from the server;

a login module 502 configured to: generate at least one login information parameter according to the user node password and the generator point of the algebraic curve, and send the login information including the identity information, at least one login information parameter, and the validity period to the server;

a user node session key generating module 503 configured to: receive at least one session key parameter of the user node from the server, and generate a user node session key according to the received at least one session key parameter of the user node; and an authenticating module 504, configured to authenticate the server according to the user node session key.

Figure 7:
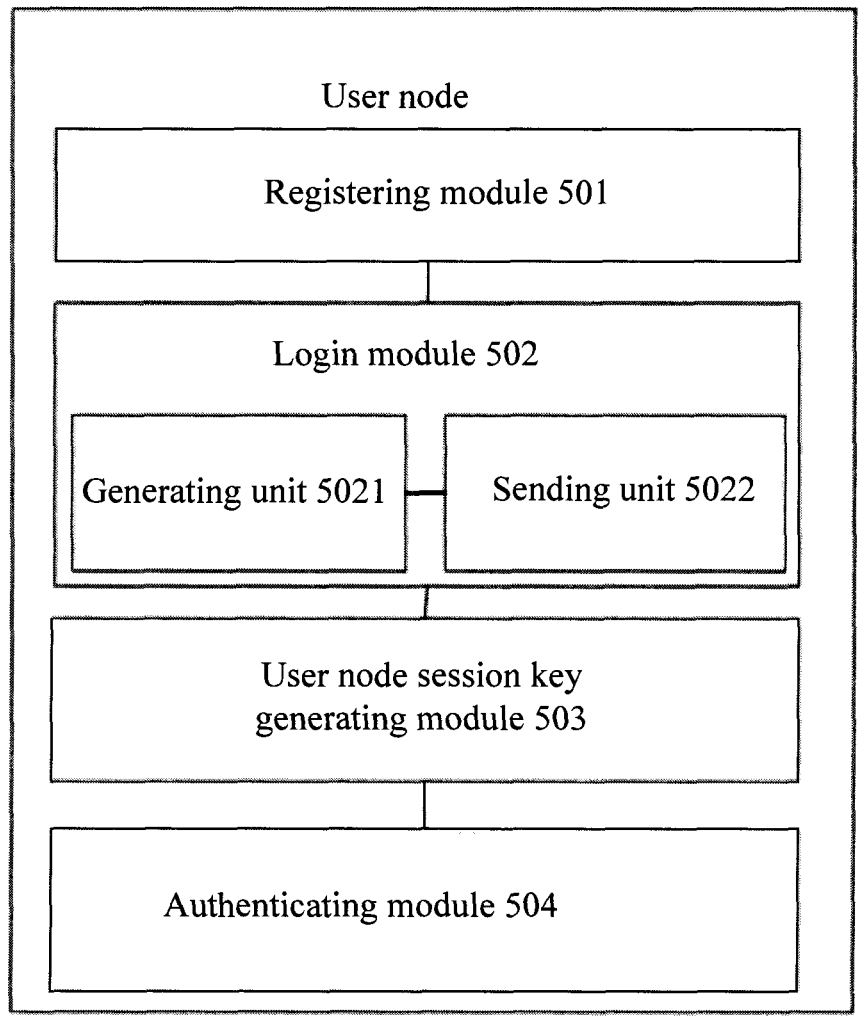
FIG. 7 shows details of structure of a user node according to the fifth embodiment of the present disclosure.

As shown in FIG. 7, the login module 502 includes:

a generating unit 5021 configured to: select a random number, perform point multiplication operation for the generator point of the algebraic curve according to the random number and the user node password, and generate at least one login information parameter; and a sending unit 5022 configured to send login information to the server, wherein the login information includes: identity information, at least one login information parameter generated by the generating unit 5021, and the validity period.

After the authentication succeeds, the user node is authorized by the server to access the resources.

The modules of the user node in this embodiment may be integrated together or isolated as required.

The user node in this embodiment may be, for example, a router, switch, base station, base station controller, Digital User Line Access Multiplexer (DSLAM), Home Location Register (HLR), mobile station, Personal Digital Assistant (PDA), computer, server, home appliance, electronic device, network device, or computer-related device, and so on.

The user node disclosed in this embodiment is simpler and more practicable because it needs to construct only one algebraic curve group (such as elliptic curve group) and apply only one security Hash function.

To sum up, compared with the prior art, the authentication design in the technical solution in the present disclosure is rather simple because it needs to construct only one algebraic curve group (such as elliptic curve group) and apply only one security Hash function. Meanwhile, the server needs only to store a key rather than store a user node password table, thus facilitating maintenance and enhancing security. For example, in order to accomplish the 1024-bit RSA strength, the required order of the elliptic curve group is only 160 bits. Therefore, the transmitted request message is shorter.

Compared with the prior art, the technical solution in the present disclosure is simpler and more practicable because it needs to construct only one elliptic curve group and apply only one security Hash function. Meanwhile, the server needs only to store a key rather than store a user node password table, thus facilitating maintenance and enhancing security. Password-based bidirectional authentication is implemented. Because the embodiments of the present disclosure are based on construction of an elliptic curve, the security is high although the login data is short. When a user node changes a login password, the server generates a new validity period and a new password after authenticating the old validity period and the old password of the user node, and returns the new validity period and password to the user node through a secure channel. The method is easy to use. The embodiments of the present disclosure are applicable to not only general authentication, but also authentication of a grid computing platform.

In the embodiments described herein, the method is based on construction of an elliptic curve group. In practice, the method under the present disclosure may also be based on other algebraic curve groups such as hyperelliptic curve group, conic curve group, and so on.

After reading the foregoing embodiments, those skilled in the art are clearly aware that the embodiments of the present disclosure may be implemented through hardware, or through software in addition to a necessary universal hardware platform. Therefore, the technical solution under the present disclosure may be embodied as a software product. The software product may be stored in a non-volatile storage medium (such as CD-ROM, USB flash disk, or mobile hard disk), and may include several instructions that enable a computer device (such as personal computer, server, or network device) to perform the methods provided in the embodiments of the present disclosure.

Although the disclosure has been described through some exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the following claims or their equivalents.

What is claimed is:

1. An authentication method implemented at a server comprising:

receiving an identifier of a user node from the user node;

selecting a validity period;

calculating a hash value according to an equation $v=h(K\|ID\|i)$, where v is the hash value, h is a hash function, K is a server key, ID is the identifier of the user node, and i is the validity period;

generating a user node password according to the identifier of the user node, the hash value, and the validity period, wherein the user node password is calculated using an equation $pw=[v]^k$, where pw is the user node password, v is the hash value, and k is a numerical exponent;

sending registration information comprising the user node password and the validity period to the user node, wherein the user node calculates a login information parameter according to a random number, the user node password, and a generator point of an algebraic curve, wherein the login information parameter is calculated using an equation $R_1=(pw \cdot r_1)P$, wherein $R_1$ is the login information parameter, pw is the user node password, $r_1$ is the random number, and P is the generator point of the algebraic curve, and wherein the user node sends the identifier, the login information parameter, and the validity period to the server as login information;

receiving the login information from the user node, wherein the login information comprises the identifier, the login parameter, and the validity period;

generating a server session key according to the identifier, the login information parameter, and the validity period;

generating at least one session key parameter of the user node according to the generator point of the algebraic curve;

sending the at least one session key parameter of the user node to the user node, wherein the at least one session key parameter of the user node is used by the user node for generating a user node session key after the user node receives the at least one session key parameter of the user node; and performing mutual authentication with the user node according to the server session key and the user node session key.

2. The authentication method of claim 1, wherein receiving the identifier of the user node, selecting the validity period, calculating the hash value, and generating the user node password comprise:

receiving the identifier submitted by the user node;
checking validity of the received identifier;
selecting the validity period;
calculating the hash value according to the server key, the identifier, and the validity period; and
generating the user node password according to a highest k bits of the hash value.

3. The authentication method of claim 1, wherein the user node calculates the login information parameter by selecting the random number from a group, performing point multiplication operation for the generator point of the algebraic curve according to the random number and the user node password, and generating the login information parameter.

4. The authentication method of claim 1, wherein generating the server session key and generating the at least one session key parameter comprise:
calculating a hash value according to the server key, the identifier, and the validity period;
generating the user node password according to a highest k bits of the hash value;
performing point multiplication operation according to the user node password and the login information;
generating at least one server session key parameter;
selecting a random number from a group:
performing point multiplication operation according to the random number and the at least one server session key parameter;
generating the server session key;
performing point multiplication operation according to the random number and the generator point of the algebraic curve; and
generating the at least one session key parameter of the user node.

5. The authentication method of claim 1, wherein performing mutual authentication with the user node according to the server session key and the user node session key comprises:
calculating a first hash value according to the server session key and the at least one session key parameter of the user node;
sending the first hash value to the user node;
determining whether the first hash value is the same as a second hash value, wherein the second hash value is calculated by the user node according to the user node session key and the at least one session key parameter of the user node;
determining that the server passes the authentication when the first hash value is the same as the second hash value;
calculating a third hash value according to the user node session key and the identifier;
receiving the third hash value at the server;
calculating a fourth hash value according to the server session key and the identifier;
determining whether the third hash value is the same as the fourth hash value; and
determining that the user node passes the authentication when the third hash value is the same as the fourth hash value.

6. The authentication method of claim 1, further comprising:
receiving, from the user node, the identifier, an old user node password, and the validity period through a secure channel which is set up after the user node is authenticated with the server;
generating a user node password according to the server key, the identifier, and the validity period;
determining whether the generated user node password is the same as the old user node password;
selecting a new validity period and generating a new user node password according to the new server key, the identifier, and the new validity period when the generated password and the old user node password are the same; and
sending the new user node password and the new validity period to the user node through the secure channel.

7. The authentication method of claim 1, wherein the algebraic curve comprises an elliptic curve, a hyper elliptic curve, or a conic curve.

8. The authentication method of claim 1, wherein the server is configured to store the server key and use the server key to authenticate multiple different user nodes.

9. A network system, comprising:
a server configured to:
receive an identifier of a user node from the user node;
select a validity period;
calculate a hash value according to an equation $v=h(K\|ID\|i)$, where v is the hash value, h is a hash function, K is a server key, and i is the validity period;
generate a user node password according to the identifier, the validity period, and the hash value, where the user node password is calculated using an equation $pw=[v]^k$, where pw is the user node password, v is the hash value, and k is a numerical exponent;
send registration information comprising the user node password and the validity period to the user node;
receive login information from the user node;
generate a server session key according to the identifier, at least one login information parameter, and the validity period, wherein the at least one login information parameter is calculated by the user node using an equation $R_1=(pw\cdot r_1)P$, where $R_1$ is the at least one login information parameter, pw is the user node password, $r_1$ is a random number, and P is a generator point of an algebraic curve;
generate at least one session key parameter of the user node according to the generator point of the algebraic curve;
send the at least one session key parameter of the user node to the user node; and
authenticate the user node according to the server session key.

10. The network system of claim 9, wherein the algebraic curve comprises an elliptic curve, a hyper elliptic curve, or a conic curve.

11. The network system of claim 9, wherein the server is configured to store the server key and use the server key to authenticate multiple different user nodes.

12. A server, in a network system comprising the server and a user node, wherein the server comprises:
a registering module configured to: receive an identifier of the user node from the user node, select a validity period, calculate a hash value according to an equation $v=h(K\|ID\|i)$, where v is the hash value, h is a hash function, K is a server key, ID is the identifier of the user node, and i is the validity period, generate a user node password according to the identifier, the validity period, and the hash value, wherein the user node password is calculated using an equation $pw=[v]^k$, where pw is the user node password, v is the hash value, and k is a numerical exponent, and send registration information comprising the user node password and the validity period to the user node;
a responding module configured to: generate a server session key according to the identifier, at least one login information parameter, and the validity period comprised in the login information after receiving the login information of the user node, wherein the at least one login information parameter is calculated by the user node according to an equation $R_1=(pw \cdot r_1)P$, where $R_1$ is the at least one login information parameter, pw is the user node password, $r_1$ is a random number, and P is a generator point on an algebraic curve, generate at least one session key parameter of the user node according to the generator point of the algebraic curve, and send the at least one session key parameter of the user node to the user node; and an authenticating module configured to authenticate the user node according to the server session key.

13. The server of claim 12, further comprising:

a receiving module configured to receive the identifier, an old password, and a validity period sent by the user node; and a password changing module configured to: generate a user node password according to the server key, the identifier, and the validity period received by the receiving module, determine whether the generated user node password is the same as the old user node password received by the receiving module; if they are the same, select a new validity period, generate a new user node password according to the new server key, the identifier, and the new validity period, and send the new user node password and the new validity period to the user node.

14. The server of claim 12, wherein the server is configured to store the server key and use the server key to authenticate multiple different user nodes.

15. A user node, comprising:

a registering module configured to: send an identifier of the user node to a server, and receive registration information comprising a user node password and a validity period from the server, wherein the user node password is calculated using an equation $pw=[v]^k$, where pw is the user node password, v is a hash value, and k is a numerical exponent, wherein the hash value is calculated using an equation $v=h(K\|ID\|i)$, where v is the hash value, h is a hash function, K is a server key, ID is the identifier of the user node, and i is the validity period;

a login module configured to: generate at least one login information parameter according to the user node password and a generator point of an algebraic curve, wherein the at least one login information parameter is calculated using an equation $R_1=(pw \cdot r_1)P$, wherein $R_1$ is the at least one login information parameter, pw is the user node password, $r_1$ is a random number, and P is the generator point of the algebraic curve, and send the login information comprising the identifier, the at least one login information parameter, and the validity period to the server;

a user node session key generating module configured to: receive the at least one session key parameter of the user node from the server, and generate a user node session key according to at least one received session key parameter of the user node; and an authenticating module configured to authenticate the server according to the user node session key.

16. The user node of claim 15, wherein the login module comprises:

a generating unit configured to: select a random number, perform point multiplication operation for the generator point of the algebraic curve according to the random number and the user node password, and generate the at least one login information parameter; and a sending unit configured to send login information to the server, wherein the login information comprises: the identifier, the at least one login information parameter generated by the generating unit, and the validity period.

17. The user node of claim 15, wherein the user node is configured to receive the server key from the server, and wherein the server key is used to authenticate the user node and also authenticate multiple different other user nodes.

* * * * *